M. ISAACSON.
ANTIFALLING DEVICE FOR HORSES.
APPLICATION FILED MAR. 24, 1916.

1,204,446.  Patented Nov. 14, 1916.

INVENTOR
Morris Isaacson
BY
Anton Phelps Marr
ATTORNEY

UNITED STATES PATENT OFFICE.

MORRIS ISAACSON, OF BROOKLYN, NEW YORK.

ANTIFALLING DEVICE FOR HORSES.

1,204,446.      Specification of Letters Patent.      Patented Nov. 14, 1916.

Application filed March 24, 1916. Serial No. 86,333.

*To all whom it may concern:*

Be it known that I, MORRIS ISAACSON, a citizen of the United States, and resident of the borough of Brooklyn, county of Kings, city and State of New York, have invented certain new and useful Improvements in Antifalling Devices for Horses, of which the following is a specification.

This device is designed for use during such time as the pavements or roads over which horses are caused to travel are covered with snow and ice or are otherwise so slippery that a horse cannot find a firm foothold.

The use of elongated calks and of chain and fiber shoes is objectionable in that they impede the progress and even though they prevent slipping they do this at the expense of speed or freedom of movement of the horse.

My device is intended to become a part of the vehicle to which the horse is hitched. It does not add a burden to the horse nor does it interfere with his free movements in any direction.

My device and its method of operation will be fully set forth as the specification progresses.

The following is what I consider a good means for carrying out the invention and the accompanying drawings are referred to in the specification in which—

Figure 1:
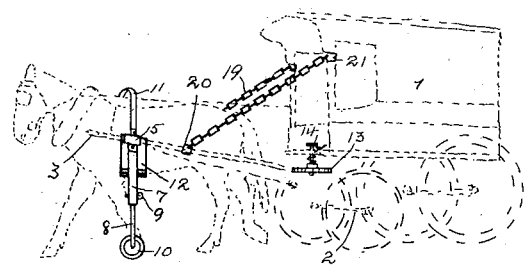
Figure 2:
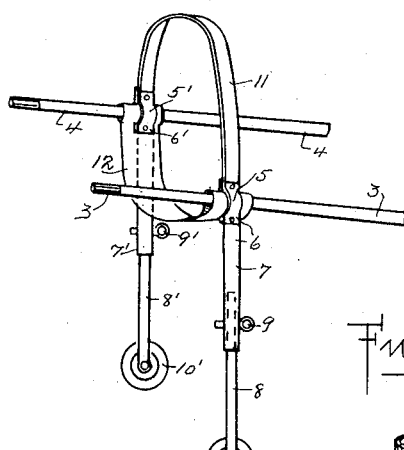
Figure 3:
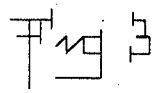
Figure 4:
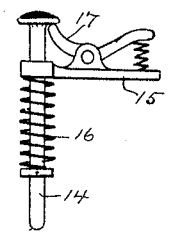
Figure 5:
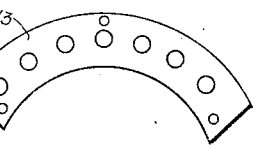

Figure 1 shows my device in operation, a horse and wagon are shown in dotted lines. Fig. 2 is an enlarged view of shafts fitted with my invention. Fig. 3 is an enlarged elevation of a part removed. Fig. 4 is a plan view of the sector. Fig. 5 shows on a large scale a modification.

Similar reference numerals indicate like parts in all the figures where they appear.

At 1, I have shown a wagon which may be a vehicle of any size, shape or style and connected to the vehicle by an ordinary well known means is the front axle 2, to which is secured a plurality of shafts 3 and 4. The shafts used in my construction should be firmly built or reinforced so that they will efficiently withstand the strain to which they may be subjected as later described. Upon each shaft and about equally distant from the axle 2, I secure a tubular member 5, formed integral with which is a lug 6, and rigidly secured in the lug is an elongated tubular member or socket 7, extending downward from the shaft. Adjustable within the socket 7, is a rod 8, and I prefer that this rod should be provided with a plurality of perforations and that a pin 9, should pass through the socket 7, and the rod 8, so that the rod will be adjustable in the socket. Rotatably supported upon the lower end of the rod 8, is a wheel 10, which may be a rubber tired or steel shod wheel.

Thus far I have described the device mounted on but one shaft but it will be understood that the opposite shaft carries a similar device as indicated by the reference characters 5' to 10' inclusive. Between the two shafts 3 and 4, secured to the tubular members 5 and 5', I may extend a metallic member 11, formed as an arch, which will pass over the back of the horse and while preventing the spreading of the shafts, will not interfere with the horse's movements. Between the shafts 3 and 4, and extending under the body of the horse I will arrange a heavy surcingle or body strap 12. Secured to the axle 2, I arrange a perforated sector 13, and upon the front step or within the foot-room of the wagon I provide a pin 14, firmly supported by a bracket 15, and provided with a spring 16, which will urge a downward movement of the pin. The pin is retained in its uppermost position by a lever 17, and when released the pin 14 will engage one of the perforations in the sector 13.

The operation of my device is as follows: The surcingle 12, being disengaged, the horse is backed into the shafts and is harnessed to the vehicle in any ordinary manner. The surcingle 12, is then secured in position and when the horse is standing upright, the wheels 10 and 10' are adjusted by means of the pins 9 and 9' so that they will be retained a short distance from the surface upon which the horse is standing. The horse may then be driven in an ordinary manner. Should he slip the weight of his body will be received in the surcingle 12, the wheels 10 and 10' will contact with the surface of the rod and will prevent a fall. When the horse is slipping or while staggering in an attempt to regain a foothold, the driver should release the pin 14, allowing it to engage the sector 13, this will prevent a sidewise movement of the shafts which will often result in throwing the horse from his feet. When the horse has regained a foothold the pin 14, may be withdrawn and the wheels 10 and 10' being elevated, the horse may be driven as before.

I see no reason why the wheels 10 and 10' could not be in constant contact with the road but as this is not necessary, to slightly elevate them would prevent unnecessary wear.

In Fig. 5 I show that the wheels 10 and 10' may be omitted and that the rods 8, may be provided with spurs 18, or may be sharpened at their outermost ends to provide a holding means. I have also discovered that certain of the advantages of my invention may be obtained if chains 19, are secured from lugs 20, arranged upon the shafts to brackets 21, secured to the vehicle.

Modifications may be made within the scope of the appended claim and without departing from the principle or sacrificing the advantages of the invention.

Having carefully and fully described my invention, what I claim and desire to secure by Letters Patent is:

A vehicle having shafts, a plurality of tubular members upon said shafts, a vertically adjustable supporting member supported by each said tubular member, a body supporting member adjacent to said tubular member and a sector secured adjacent to said shafts and means coöperating with said sector to prevent a sidewise movement of said shafts as and for the purpose set forth.

Signed at the city, county and State of New York, this 17th day of March 1916.

MORRIS ISAACSON.

Witnesses:
 G. E. S. MARR,
 ARTHUR PHELPS MARR.